R. C. ERWIN.
RAKE.
APPLICATION FILED OCT. 14, 1912. RENEWED SEPT. 29, 1913.
1,089,542.
Patented Mar. 10, 1914.
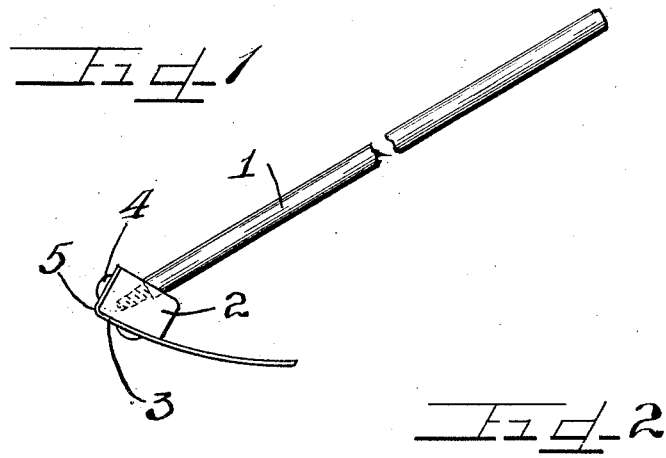
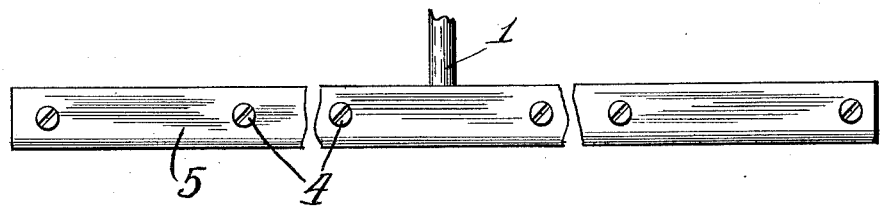
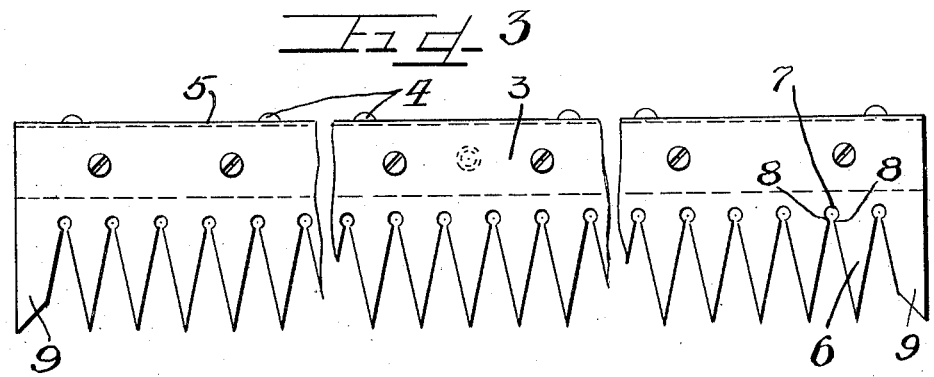
Witnesses
J. W. Angell
Charles W. Mills
Inventor
Roswell C. Erwin
Charles W. Mills
Atty.

UNITED STATES PATENT OFFICE.

ROSWELL C. ERWIN, OF OAK PARK, ILLINOIS.

RAKE.

1,089,542. Specification of Letters Patent. Patented Mar. 10, 1914.

Application filed October 14, 1912, Serial No. 725,568. Renewed September 29, 1913. Serial No. 792,487.

*To all whom it may concern:*

Be it known that I, ROSWELL C. ERWIN, a citizen of the United States, and a resident of the town of Oak Park, in the county of Cook and State of Illinois, have invented certain new and useful Improvements in Rakes; and I do hereby declare that the following is a full, clear, and exact description of the same, reference being had to the accompanying drawings, and to the numbers of reference marked thereon, which form a part of this specification.

This invention relates more particularly to a rake adapted to sever the blossoms from weeds and thereby prevent the same from going to seed.

It is an important object of this invention to provide a rake adapted to engage and cut the scape of a weed, such as a dandelion, at a point beneath the sepal.

It is also an object of this invention to provide a simple, durable and convenient device of the class described, which may be used by one who has not had previous experience.

The invention (in a preferred form) consists in the matters hereinafter described, and more fully pointed out and defined in the appended claims.

In the drawings: Figure 1 is a fragmentary end elevation of a device embodying my invention. Fig. 2 is a fragmentary top plan view thereof. Fig. 3 is a fragmentary front elevation of the same.

As shown in the drawings: The device embodying my invention comprises a suitable handle 1, having a transverse bar 2, secured on one end thereof, and an oblique concave plate of metal 3, rigidly secured to said bar 2, by screws 4, or any other suitable means. As shown, the upper edge of said plate 3, is provided with a flange 5, which extends over and is engaged to the top of the transverse bar 2, and thus affords a rigid construction. The lower edge or concave portion of said plate 3, is cut to afford a plurality of teeth 6, which converge to a throat 7, adapted to receive the stem or scape of a weed therein and cut the same after it has been scarred by sharp outwardly directed portions 8, on the opposite edges of adjacent teeth.

As shown in Fig. 3, the end teeth 9, are wider than the intermediate teeth and are shaped to coact with the adjacent teeth 6, and at the same time resist bending.

The operation is as follows: In raking a lawn where there is a large quantity of dandelions or other similar weeds, the rake is used as usual, except that the rake is supported upon the face of the plate 3, as shown in Fig. 1, instead of upon the sharp points of the teeth, and in passing over the lawn the stems or scapes of the weeds pass between and are scarred by the sharp points 8, on the edges of the teeth, and are then cut by a slight pull upon the handle of the rake.

Of course, it is obvious from the construction described that details of the construction may be varied without departing from the spirit of my invention. I therefore do not purpose limiting the patent issued upon this application for patent, otherwise than necessitated by the prior art.

I claim as my invention:

1. A rake comprising a handle, a plate connected therewith and having its lower edge shaped to afford a plurality of teeth which converge to a throat having sharp outwardly directed portions on the opposite edges of the same.

2. A rake comprising a handle, a cross bar secured on one end thereof, a concave plate secured to said cross bar and having its upper edge bent thereover, and its lower edge shaped to afford a plurality of teeth which converge to a throat adapted to receive and cut the scape of a weed at a point beneath the sepal.

3. A rake comprising a handle, a cross bar secured on one end thereof, a concave plate secured to said cross bar and having its upper edge bent thereover, and its lower edge shaped to afford a plurality of teeth which converge to a throat having sharp outwardly directed portions on the opposite edges of the same adapted to scar the scape of a weed at a point beneath the sepal as it passes into the throat.

In testimony whereof I have hereunto subscribed my name in the presence of two subscribing witnesses.

ROSWELL C. ERWIN.

Witnesses:
CHARLES W. HILLS, Jr.,
GEORGE R. MOORE.

---

Copies of this patent may be obtained for five cents each, by addressing the "Commissioner of Patents, Washington, D. C."